(12) United States Patent
Ichinokawa (10) Patent No.: US 11,359,928 B2
(45) Date of Patent: Jun. 14, 2022

(54) NOTIFICATION SYSTEM, NOTIFICATION CONTROL METHOD, AND STORAGE MEDIUM

(71) Applicant: HONDA MOTOR CO., LTD., Tokyo (JP)

(72) Inventor: Jumpei Ichinokawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

(21) Appl. No.: 16/559,823

(22) Filed: Sep. 4, 2019

(65) Prior Publication Data
US 2020/0080863 A1 Mar. 12, 2020

(30) Foreign Application Priority Data
Sep. 11, 2018 (JP) .............................. JP2018-169673

(51) Int. Cl.
*B60W 30/18* (2012.01)
*B60W 50/14* (2020.01)
(Continued)

(52) U.S. Cl.
CPC ... *G01C 21/3658* (2013.01); *B60W 30/18163* (2013.01); *B60W 50/14* (2013.01); *G01C 21/3655* (2013.01); *B60W 2050/146* (2013.01)

(58) Field of Classification Search
CPC ........... B60W 30/18163; B60W 50/14; B60W 2050/146; G01C 21/3658; G01C 21/3655;
(Continued)

(56) References Cited

U.S. PATENT DOCUMENTS

| 2018/0216955 A1* | 8/2018 | Kanno | G01C 21/3658 |
| 2018/0297611 A1* | 10/2018 | Fujisawa | G01C 21/365 |
| 2020/0090514 A1* | 3/2020 | Sakaguchi | G08G 1/16 |

FOREIGN PATENT DOCUMENTS

| JP | 2006-184007 | 7/2006 |
| JP | 2017-053678 | 3/2017 |

(Continued)

OTHER PUBLICATIONS

Japanese Office Action for Japanese Patent Application No. 2018-169673 dated Oct. 26, 2021.

*Primary Examiner* — Abby Y Lin
*Assistant Examiner* — Hossam M Abd El Latif
(74) *Attorney, Agent, or Firm* — Amin, Turocy & Watson, LLP (57) ABSTRACT

A notification system includes a route decision unit that decides a route to a destination of a vehicle, a notification unit that notifies an occupant of guidance information for guiding the occupant regarding a lane change from a traveling lane of the vehicle to a recommended lane associated with the route to the destination decided by the route decision unit, and an HMI control unit that controls a notification start time of the guidance information for each lane on the basis of the number of lanes between the traveling lane and the recommended lane. In a case where the vehicle performs a lane change after a notification of the guidance information, the HMI control unit continues a notification of the guidance information even when a notification start time which is set for a lane after a lane change has not been reached.

10 Claims, 8 Drawing Sheets

(51) Int. Cl.
*G01C 21/36* (2006.01)
*G05D 1/02* (2020.01)

(58) Field of Classification Search
CPC ............ G01C 21/3632; G01C 21/3629; G01C 21/3647; G05D 1/0257; G05D 1/0223; G05D 1/0214; G05D 1/028; G05D 1/0276; G05D 2201/02; G05D 1/0251
USPC ........................................................ 701/428
See application file for complete search history.

(56) References Cited

FOREIGN PATENT DOCUMENTS

| | | | |
|---|---|---|---|
| JP | 2017-173261 | | 9/2017 |
| JP | 2018146461 A | * | 9/2018 |
| JP | 2018149915 A | * | 9/2018 |

* cited by examiner

FIG. 10 under the examined Patent Application, First Publication No. 2017-53678 and Japanese Unexamined Patent Application, First Publication No. 2017-173261).

NOTIFICATION SYSTEM, NOTIFICATION CONTROL METHOD, AND STORAGE MEDIUM

CROSS-REFERENCE TO RELATED APPLICATION

Priority is claimed on Japanese Patent Application No. 2018-169673, filed Sep. 11, 2018, the content of which is incorporated herein by reference.

BACKGROUND

Field of the Invention

The present invention relates to a notification system, a notification control method, and a storage medium.

Description of Related Art

In the past, there have been driving assistance systems that display a route to a destination on a screen to assist a driver's driving. In connection with this, there are techniques in which a lane movement recommendation section for recommending a lane change to a guide lane is specified, and an image of a road on which a vehicle is traveling and an indication image for prompting lane movement superimposed on the lane movement recommendation section are displayed (for example, Japanese Unexamined Patent Application, First Publication No. 2017-53678 and Japanese Unexamined Patent Application, First Publication No. 2017-173261).

SUMMARY

However, in the related art, an occupant may not be notified of guidance information relating to a lane change in an appropriate notification state depending on a road shape or the traveling situation of a vehicle.

The present invention was contrived in view of such circumstances, and one object thereof is to provide a notification system, a notification control method, and a storage medium which make it possible for guidance information relating to a lane change to be notified of in a more appropriate notification state.

A notification system, a notification control method, and a storage medium according to this invention have the following configurations adopted therein.

(1) According to an aspect of this invention, there is provided a notification system including: a route decision unit that decides a route to a destination of a vehicle; a notification unit that notifies an occupant of guidance information for guiding the occupant regarding a lane change from a traveling lane of the vehicle to a recommended lane associated with the route to the destination decided by the route decision unit; and an HMI control unit that controls a notification start time of the guidance information for each lane on the basis of the number of lanes between the traveling lane and the recommended lane, wherein, in a case where the vehicle performs a lane change after a notification of the guidance information, the HMI control unit continues a notification of the guidance information even when a notification start time which is set for a lane after a lane change has not been reached.

(2) In the aspect of the above (1), the HMI control unit sets the notification start time with respect to each of a plurality of lanes in which traveling is possible in the same direction as a traveling direction of the vehicle on the basis of a lane change limit point at which a lane change to the recommended lane is possible.

(3) In the aspect of the above (2), the HMI control unit sets the notification start time for each of the lanes on the basis of a distance from the lane change limit point.

(4) In the aspect of the above (3), as a lane becomes farther away from the recommended lane, the HMI control unit increases a distance from the lane change limit point at a predetermined interval, and sets the notification start time for each of the lanes.

(5) In the aspect of the above (2), the HMI control unit ends a notification of the guidance information in a case where the vehicle is not traveling in the recommended lane and the vehicle reaches the lane change limit point.

(6) In the aspect of the above (5), as the traveling lane of the vehicle becomes farther away from the recommended lane, the lane change limit point becomes more distant from a lane change point.

(7) In the aspect of the above (1), in a case where the vehicle is traveling in the recommended lane, the HMI control unit causes the notification unit to notify of lane change non-necessity information indicating that a lane change of the vehicle is unnecessary in place of the guidance information.

(8) In the aspect of the above (1), the notification unit includes a display unit that displays an image, and the HMI control unit moves and displays an image relating to the guidance information in accordance with a change of the traveling lane of the vehicle.

(9) According to an aspect of this invention, there is provided a notification control method including causing a computer to: decide a route to a destination of a vehicle; notify an occupant of guidance information for guiding the occupant regarding a lane change from a traveling lane of the vehicle to a recommended lane associated with the decided route to the destination; control a notification start time of the guidance information for each lane on the basis of the number of lanes between the traveling lane and the recommended lane; and continuing, in a case where the vehicle performs a lane change after a notification of the guidance information, a notification of the guidance information even when a notification start time which is set for a lane after a lane change has not been reached.

(10) According to an aspect of this invention, there is provided a computer readable non-transitory storage medium having a program stored therein, the program causing a computer to: decide a route to a destination of a vehicle; notify an occupant of guidance information for guiding the occupant regarding a lane change from a traveling lane of the vehicle to a recommended lane associated with the decided route to the destination; control a notification start time of the guidance information for each lane on the basis of the number of lanes between the traveling lane and the recommended lane; and continuing, in a case where the vehicle performs a lane change after a notification of the guidance information, a notification of the guidance information even when a notification start time which is set for a lane after a lane change has not been reached.

According to the above (1) to (10), it is possible to notify of guidance information relating to a lane change in a more appropriate notification state.

DESCRIPTION OF EMBODIMENTS

Hereinafter, an embodiment of a notification system, a notification control method, and a storage medium of the present invention will be described with reference to the accompanying drawings. In the embodiment, an example in which the notification system is mounted in a vehicle including a driving assistance device such as an advanced driver assistance systems (ADAS) or a navigation device that provides guidance for a route to a destination will be described. Driving assistance in the embodiment includes, for example, an adaptive cruise control system (ACC), a lane keeping assistance system (LKAS), a collision mitigation brake system (CMBS), or the like. In the following, a case where rules of left-hand traffic are applied will be described, but in a case where rules of right-hand traffic are applied, the right and left may be interchanged when reading.

[Overall Configuration]

Figure 1:
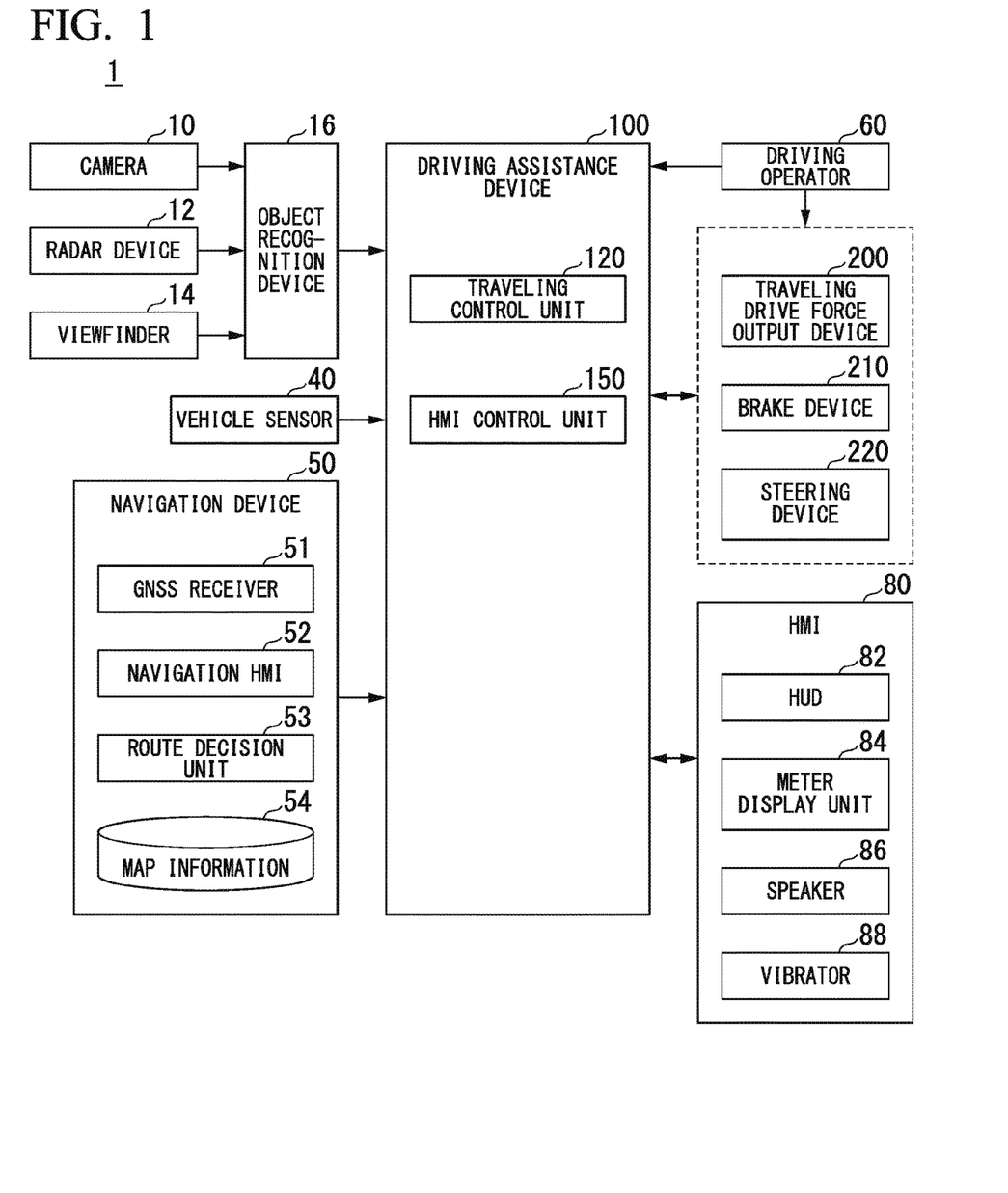
FIG. 1 is a configuration diagram of a vehicle system including a notification system of an embodiment.

FIG. 1 is a configuration diagram of a vehicle system 1 including the notification system of the embodiment. A vehicle in which the vehicle system 1 is mounted (hereinafter referred to as a vehicle M) is, for example, a two-wheeled, three-wheeled, or four-wheeled vehicle or the like, and the driving source is an internal-combustion engine such as a diesel engine or a gasoline engine, an electric motor, or a combination thereof. The electric motor operates using power generated by a generator connected to an internal-combustion engine or power discharged from a secondary battery or a fuel cell. In FIG. 1, the vehicle system 1 includes, for example, a camera 10, a radar device 12, a viewfinder 14, an object recognition device 16, a vehicle sensor 40, a navigation device 50, a driving operator 60, a human machine interface (HMI) 80, a driving assistance device 100, a traveling drive force output device 200, a brake device 210, and a steering device 220. These devices or instruments are connected to each other through a multiplex communication line such as a controller area network (CAN) communication line, a serial communication line, a wireless communication network, or the like. The configuration of the vehicle system 1 shown in FIG. 1 is merely an example, and portions of the configuration may be omitted, or other components may be added thereto. A combination of the navigation device 50, the HMI 80, and the HMI control unit 150 is an example of a "notification system." The HMI control unit 150 is an example of a "notification control unit." The HMI 80 is an example of a "notification unit." A combination of a navigation HMI 52, an HUD 82, and a meter display unit 84 is an example of the "display unit."

The camera 10 captures an image of the vicinity of the vehicle M, and generates a captured image. The camera 10 is a digital camera using a solid-state imaging element such as, for example, a charge coupled device (CCD) or a complementary metal oxide semiconductor (CMOS). The camera 10 is installed at any point on the vehicle M in which the vehicle system 1 is mounted. The vicinity of the vehicle M includes the front of the vehicle M, and may include the side or rear of the vehicle M. For example, in a case where a forward image of the vehicle M is captured, the camera 10 is installed on the upper portion of the front windshield, the rear surface of the rear-view mirror, or the like. The camera 10 may be a stereo camera.

The radar device 12 radiates radio waves such as millimeter waves to the vicinity of the vehicle M in a predetermined irradiation direction, and detects radio waves (reflected waves) reflected from an object to detect at least the position (distance to and orientation of) of the object. The object is, for example, another vehicle, an obstacle, a structure, or the like that is present in the vicinity of the vehicle M. One or a plurality of radar devices 12 are installed at any points on the vehicle M. The radar device 12 may detect the position and speed of an object with a frequency modulated continuous wave (FMCW) system.

The viewfinder 14 is a light detection and ranging or laser imaging detection and ranging (LIDAR) finder that measures scattered light with respect to irradiation light with which the vicinity of the vehicle M is irradiated in a predetermined irradiation direction, and detects a distance to an object. One or a plurality of viewfinders 14 are installed at any points on the vehicle M.

The object recognition device 16 recognizes the position, type, speed or the like of an object present in the vicinity of the vehicle M by performing a sensor fusion process on detection results based on some or all of the camera 10, the radar device 12, and the viewfinder 14. In addition, the object recognition device 16 may recognize a road shape in the vicinity of the vehicle M through a sensor fusion process. The object recognition device 16 outputs recognition results to the driving assistance device 100.

The vehicle sensor 40 includes, for example, a vehicle speed sensor that detects the speed of the vehicle M (hereinafter referred to as a vehicle speed), an acceleration sensor that detects an acceleration, a yaw rate sensor that detects an angular velocity around a vertical axis, an orientation sensor that detects the direction of the vehicle M, or the like.

The navigation device 50 includes, for example, a global navigation satellite system (GNSS) receiver 51, a navigation HMI 52, and a route decision unit 53, and has map information 54 held in a storage device such as a hard disk drive (HDD) or a flash memory. The map information 54 is, for example, information in which a road shape is represented by a link indicating a road and nodes connected by a link. Links include, for example, a traffic message channel (TMC) link. A TMC link is, for example, information for specifying a road section which is a target for delivery in a case where an external server delivers traffic information to the vehicle M, and is managed by an identification number for identifying each road section. The map information 54 may include a link shape, traffic regulations, a road type, a lane width, the number of lanes, a road structure, the curvature of a road, sign information, point of interest (POI) information, or the like. The sign information includes, for example, a road name, road identification information, a speed limit, traffic regulations (one-way traffic, a straight-ahead lane, a right-turn lane, or a parking ban), information relating to a destination of a road (for example, an area or a road), or the like. The map information 54 may include, for example, information of the center of a lane, information of the boundary of a lane, or the like.

The GNSS receiver 51 specifies the position of the vehicle M, on the basis of signals received from GNSS satellites. The navigation HMI 52 includes a display device, a speaker, a touch panel, a key, or the like. A portion or the entirety of the navigation HMI 52 may be shared with the HMI 80 to be described later. The route decision unit 53 refers to the map information 54 to decide a route to a destination (including, for example, information relating to a transit point during traveling to a destination) input by an occupant (including a driver) using the navigation HMI 52 and a recommended lane based on the route to a destination, for example, from the position of the vehicle M specified by the GNSS receiver 51 (or any input position). For example, the route decision unit 53 divides a route on a map to a destination into a plurality of blocks (for example, divides a route on a map every 100 [m] in a vehicle traveling direction), and decides a recommended lane for each divided block. The route decision unit 53 decides, for example, a lane numbered from the left on which a vehicle will travel. In a case where a divergence point or a merging point is present in a route on a map, the route decision unit 53 decides a recommended lane so that the vehicle M has a tendency to advance to a divergence destination or a merging destination. The navigation device 50 performs route guidance using the navigation HMI 52 on the basis of the route decided by the route decision unit 53 during its operation.

The driving operator 60 is an operator for a driver to control the steering and speed of the vehicle M using manual driving. The driving operator 60 includes, for example, an accelerator pedal, a brake pedal, a shift lever, a steering wheel, or the like. The HMI 80 notifies an occupant of the vehicle M of various types of information, and accepts the occupant's input operation. The HMI 80 includes, for example, various types of display devices such as the HUD 82 and the meter display unit 84, the speaker 86, and a vibrator 88. The HMI 80 may include a light-emitting unit, a buzzer, a microphone, various operation switches, a key, or the like. The HMI 80 may include, for example, an operating unit for switching between starting or ending of operations of a traveling control unit 120 and the navigation device 50, an operating unit for selecting a display unit that displays an image which is controlled by the HMI control unit 150, or the like. The details of the HMI 80 will be described later.

The driving assistance device 100 includes, for example, the traveling control unit 120 and the HMI control unit 150. In a case where an instruction for starting the operation of the traveling control unit 120 is accepted by the HMI 80, the traveling control unit 120 executes driving assistance control of the vehicle M on the basis of information which is obtained from the object recognition device 16, the vehicle sensor 40 or the like until an instruction for ending the operation of the traveling control unit 120 is accepted, or until arrival at a destination. For example, when an ACC is executed, the traveling control unit 120 controls the traveling drive force output device 200 and the brake device 210 so as to travel in a state where an inter-vehicle distance between the vehicle M and a preceding vehicle is kept constant on the basis of information which is input from the camera 10, the radar device 12, and the viewfinder 14 through the object recognition device 16. That is, the traveling control unit 120 performs acceleration or deceleration control (speed control) based on an inter-vehicle distance from a preceding vehicle. When an LKAS is executed, the traveling control unit 120 controls the steering device 220 so that the vehicle M travels while keeping a traveling lane in which the vehicle is currently traveling. That is, the driving assistance device 100 performs steering control for lane keeping. When a CMBS is executed, the traveling control unit 120 controls the traveling drive force output device 200, the brake device 210, and the steering device 220 so as to avoid contact with an obstacle which is approaching the vehicle M. That is, the driving assistance device 100 performs acceleration or deceleration control and steering control for avoiding contact with an object.

The HMI control unit 150 causes the HMI 80 to notify a driver of information relating to driving assistance in a predetermined notification mode. The information relating to driving assistance includes, for example, information relating to surrounding road shapes, the operation state of a driving assistance function (for example, an ACC, an LKAS, or a CMBS) executed by the driving assistance device 100, information relating to a recommended lane, a road sign, or the like. The HMI control unit 150 causes the HMI 80 to notify of information relating to a lane change in a predetermined notification mode. The information relating to a lane change includes, for example, lane change guidance information for guiding an occupant regarding a lane change (an example of guidance information), lane change non-necessity information indicating to an occupant that a lane change is unnecessary, or the like. The details of the function of the HMI control unit 150 will be described later.

The traveling drive force output device 200 outputs a drive force (torque) for the vehicle M to travel to a drive wheel. The traveling drive force output device 200 includes, for example, a combination of an internal-combustion engine, an electric motor, a transmission and the like and an electronic control unit (ECU) that controls these components. The brake device 210 includes, for example, a brake caliper, a cylinder that transfers hydraulic pressure to the brake caliper, an electric motor that generates hydraulic pressure for the cylinder, and a brake ECU. The brake ECU controls the electric motor in accordance with information which is input from the driving operator 60 or information which is input from the traveling control unit 120, and allows a brake torque according to a braking operation to be output to each wheel. The steering device 220 includes, for example, a steering ECU and an electric motor. The steering ECU drives the electric motor in accordance with the information which is input from the driving operator 60 or the information which is input from the traveling control unit 120, and changes the direction of a turning wheel.

[HMI]

Figure 2:
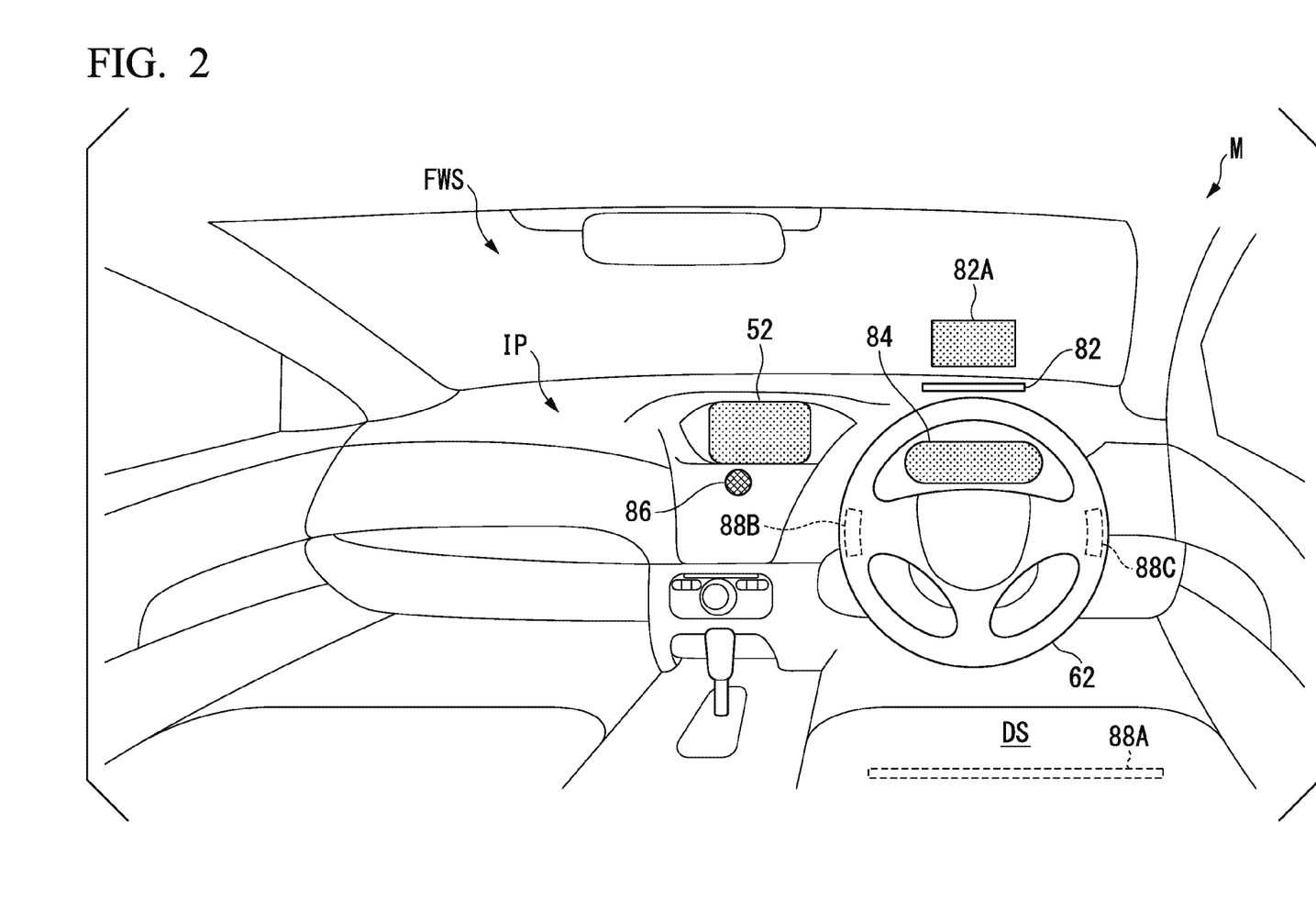
FIG. 2 is a diagram illustrating an interior state of a vehicle M in which each unit of an HMI is mounted.

Next, the HMI 80 will be described. FIG. 2 is a diagram illustrating an interior state of the vehicle M in which each unit of the HMI 80 is mounted. As shown in FIG. 2, the navigation HMI 52 is a display device such as a liquid crystal display (LCD) or an organic electro luminescence (EL) display disposed at the central portion of an instrument panel IP. The navigation HMI 52 includes, for example, a touch panel that accepts an input operation based on the touch of an occupant's finger. The navigation HMI 52 displays a road shape in the vicinity of the vehicle M acquired by the map information 54 or a map and a route to a destination decided by the route decision unit 53. The navigation HMI 52 may perform a notification of information relating to driving assistance, information relating to a lane change, or the like in a notification mode controlled by the HMI control unit 150.

The HUD 82 is provided on or inside the instrument panel IP, and allows a driver who sits on the driver's seat DS to visually recognize a virtual image by projecting light including an image onto a display region 82A of a portion of a front windshield FWS in front of the driver's seat DS. The front windshield FWS is a light-transmissive member. The HUD 82 may be realized by a light-transmissive display device (for example, a liquid crystal display or an organic EL) installed on the front windshield FWS, may project light onto a transparent member included in a device worn on by a person on his/her body (such as a visor or a spectacle lens), or may have a light-transmissive display device installed thereon.

The HUD 82 allows a driver to visually recognize, for example, an image obtained by imaging the information relating to driving assistance or the information relating to a lane change described above, as a virtual image, in a display mode controlled by the HMI control unit 150. The HUD 82 may allow a driver to visually recognize an image obtained by imaging a vehicle speed, a driving force distribution ratio, an engine speed, an operation state of a driving assistance function (for example, an ACC, an LKAS, or a CMBS), a shift position, or the like, as a virtual image, in a display mode controlled by the HMI control unit 150. Hereinafter, the HMI control unit 150 causing the HUD 82 to execute the above-described process is assumed to be referred to as "causing the HUD 82 to display an image."

The meter display unit 84 is, for example, a display device which is provided in a vicinity in front of the driver's seat DS in the instrument panel IP, and can be visually recognized by a driver from a gap in a steering wheel 62 which is an example of the driving operator 60 or over the steering wheel 62. The meter display unit 84 is, for example, a display device such as an LCD or an organic EL display. The meter display unit 84 displays, for example, meters and gauges such as a speed meter or an engine speed meter. The meter display unit 84 may display the information relating to driving assistance or the information relating to a lane change described above in a display mode controlled by the HMI control unit 150 in regions other than a region for displaying these meters and gauges.

The speaker 86 is provided on, for example, the instrument panel IP. The speaker 86 may be provided on a door, a ceiling, a seat, or the like. The speaker 86 outputs, as voice, the information relating to driving assistance or the information relating to a lane change described above to the interior of a vehicle in a notification mode controlled by the HMI control unit 150.

The vibrator 88 is provided in, for example, the driver's seat DS, the steering wheel 62, a seat belt, or the like. In the example of FIG. 2, a vibrator 88A is provided in the driver's seat DS, and vibrators 88B and 88C are provided in the steering wheel 62. The vibrator 88 performs a predetermined vibration at a timing when the information relating to driving assistance or the information relating to a lane change described above is notified of in a notification mode controlled by the HMI control unit 150. The predetermined vibration may be changed in accordance with, for example, the type of information relating to driving assistance or information relating to a lane change. Through a notification based on the vibrator 88, a driver feels the vibration of the driver's seat DS or the steering wheel 62 in his/her body or hand, and thus can ascertain that driving assistance is being executed, a lane change is necessary, information relating to driving assistance or information relating to a lane change is being notified of by the HUD 82 or a voice, or the like.

[HMI Control Unit]

Figure 3:
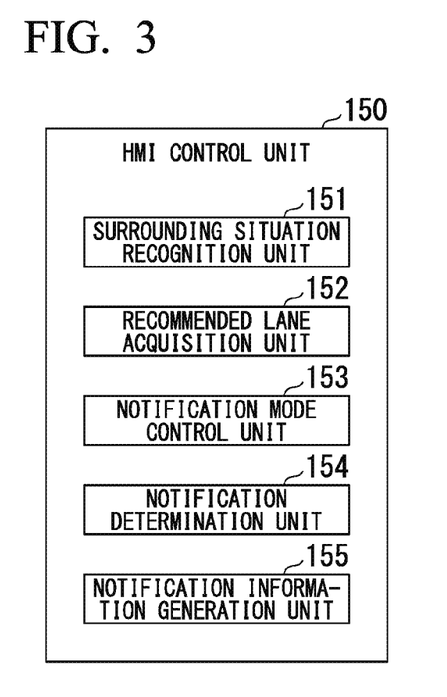
FIG. 3 is a functional configuration diagram of an HMI control unit of the embodiment.

Next, the configuration example of the HMI control unit 150 will be described. FIG. 3 is a functional configuration diagram of the HMI control unit 150 of the embodiment. The HMI control unit 150 includes, for example, a surrounding situation recognition unit 151, a recommended lane acquisition unit 152, a notification mode control unit 153, a notification determination unit 154, and a notification information generation unit 155. These components are realized by a hardware processor such as, for example, a central processing unit (CPU) executing a program (software). Some or all of these components may be realized by hardware (a circuit unit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device such as the hard disk drive (HDD) or the flash memory of the driving assistance device 100 (a storage device including a non-transitory storage medium) in advance, may be stored in a detachable storage medium such as a DVD or a CD-ROM, or may be installed in the HDD or the flash memory of the driving assistance device 100 by the storage medium (non-transitory storage medium) being mounted in a drive device.

The surrounding situation recognition unit 151 refers to the map information 54 on the basis of position information of the vehicle M specified by the GNSS receiver 51, and recognizes the surrounding situation of the vehicle M. The surrounding situation includes, for example, a road shape or the number of lanes in the vicinity of the vehicle M, the traveling lane of the vehicle M, sign information, or the like. The surrounding situation recognition unit 151 may acquire an image in front of the vehicle M captured by the camera 10 in place of (or in addition to) acquisition from the map information 54, analyze the acquired image, and recognize a lane drawn on a road, a lane partitioned off by a structure such as a median strip, the number of lanes, a road shape, a traveling lane, and the like.

In a case where the navigation device 50 is in operation, the recommended lane acquisition unit 152 acquires information relating to a recommended lane associated with a route to a destination.

The notification mode control unit 153 controls a notification mode in which a driver is notified of information relating to driving assistance or information relating to a lane change. The notification mode includes a target device that outputs information which is notified of in the HMI 80, a time at which a notification is started, a section in which a notification is continued, notification content, or the like. For example, the notification mode control unit 153 controls a notification start time of information relating to a lane change on the basis of the number of lanes between a traveling lane recognized by the surrounding situation recognition unit 151 and a recommended lane acquired by the recommended lane acquisition unit 152. The details of the function of the notification mode control unit 153 will be described later.

The notification determination unit 154 determines whether it is necessary to notify a driver of information relating to a lane change on the basis of a notification condition determined for each lane. The notification condition is, for example, that the traveling lane of the vehicle M is not a recommended lane, the vehicle M has reached a notification start time which is set by the notification mode control unit 153, or the like. The notification determination unit 154 determines that it is necessary to notify of the information relating to a lane change in a case where the above-described notification condition is satisfied, and determines that it is not necessary to notify of the information relating to a lane change in a case where the notification condition is not satisfied.

The notification information generation unit 155 generates information for notifying an occupant of information relating to driving assistance in a notification mode which is set by the notification mode control unit 153. For example, in a case where the information relating to driving assistance is displayed on a display unit such as the HUD 82, the notification information generation unit 155 generates an image corresponding to the information relating to driving assistance, and causes a target display unit to display the generated image. In a case where voice output is performed by the speaker 86, the notification information generation unit 155 generates a voice corresponding to the information relating to driving assistance, and causes the speaker 86 to output the generated voice. The generated voice includes, for example, the operation state of a driving assistance function, sign information relating to a traveling lane, or the like. In a case where a predetermined vibration is output by the vibrator 88, the notification information generation unit 155 generates vibration information corresponding to the information relating to driving assistance, and vibrates the vibrator 88 on the basis of the generated vibration information.

In a case where the notification determination unit 154 determines that it is necessary to notify of the information relating to a lane change, the notification information generation unit 155 generates information of which an occupant is notified on the basis of a notification mode which is set for each lane by the notification mode control unit 153.

[Notification Mode Control Unit]

Figure 4:
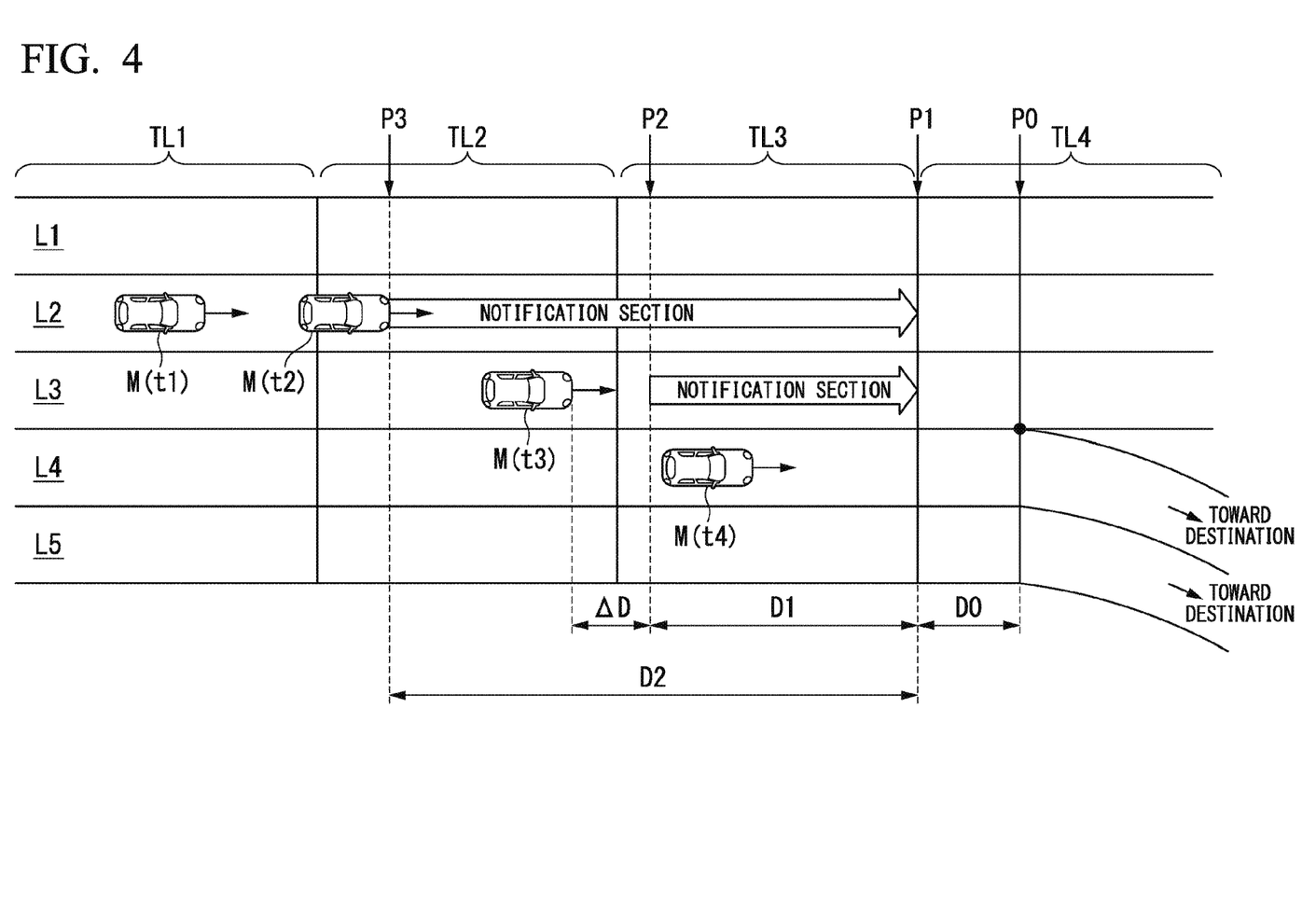
FIG. 4 is a diagram illustrating a process of a notification mode control unit.

Next, a specific example of the process of the notification mode control unit 153 and information which is notified of in a notification mode controlled by the notification mode control unit 153 will be described. FIG. 4 is a diagram illustrating the process of the notification mode control unit 153. In the example of FIG. 4, the vehicle M is assumed to travel on a road of five lanes L1 to L5. The lanes L1 to L5 are lanes in which traveling to a divergence point P0 in the same direction as the traveling direction of the vehicle M is possible. Recommended lanes for heading toward a destination which is set by the navigation device 50 are assumed to be the lanes L4 and L5. In FIG. 4, TL1 to TL4 represent identification information of a TMC link, and the position of the vehicle M at time t1 to t4 is denoted as vehicles M(t1) to M(t4).

The notification mode control unit 153 sets a notification mode relating to a road shape, a road sign, or the like shown in FIG. 4 as the information relating to driving assistance, and causes the HMI 80 to notify of the information relating to driving assistance on the basis of the set notification mode. For example, the notification mode control unit 153 updates and notifies of the information relating to driving assistance at a timing when the identification information of a TMC link is switched, or a timing when a lane in which the vehicle M travels is switched.

The notification mode control unit 153 sets a notification start time at which a notification of lane change guidance information is started for each lane on the basis of the number of lanes between a traveling lane in which the vehicle M travels and the recommended lanes L4 and L5 associated with a route to a destination. In the example of FIG. 4, the vehicle M travels in the lane L2 at a point in time of time t1. Therefore, the notification mode control unit 153 sets notification start times of the lane L2 and L3 on the basis of the number of lanes between the traveling lane L2 and the recommended lane L4 out of the recommended lanes L4 and L5 which is closest to the traveling lane.

For example, the notification mode control unit 153 sets a point P1 at a predetermined distance D0 ahead from a point (junction) P0 at which the recommended lane L4 and the lane L3 diverge as a lane change limit point P1 at which a lane change is possible with respect to the lane L3 adjacent to the recommended lane L4. The lane change limit point P1 may be changed on the basis of, for example, a vehicle speed detected by the vehicle sensor 40, a road shape, or the like. Next, the notification mode control unit 153 sets a timing at which the vehicle M reaches a point P2 at a predetermined distance D1 ahead from the lane change limit point P1 as a notification start time in the lane L3. That is, the notification mode control unit 153 sets the notification start time on the basis of a distance from the lane change limit point P1.

The notification mode control unit 153 sets a timing at which the vehicle M reaches the point P3 at a predetermined distance D2 ahead from the lane change limit point P1 as a notification start time in the lane L2 with respect to the lane L2 away from the recommended lane L4 by two lanes (the lane L2 adjacent to the lane L3). The predetermined distance D2 is, for example, a distance two times the predetermined distance D1. That is, as the traveling lane of the vehicle M becomes farther away from a recommended lane, the notification mode control unit 153 increases a distance from the lane change limit point P1 at a predetermined interval, and sets a notification start time for each lane. The predetermined interval is, for example, a constant interval based on the predetermined distance D1. In this manner, the notification mode control unit 153 can increase a notification start time for each lane in association with the number of lanes between the traveling lane and the recommended lane, thereby allowing the lane change guidance information to be notified of at an appropriate timing for each lane.

The notification mode control unit 153 sets a method of notifying a driver of the lane change guidance information for each lane. For example, in a case where the vehicle M travels in the lane L2, two lane changes are required before the vehicle is traveling in the recommended lane L4, and thus the lane change guidance information is notified of through the HUD 82 and the speaker 86. In a case where the vehicle M travels in the lane L3, one lane change is just required, and thus the lane change guidance information is notified of through the HUD 82. In a case where a distance between the vehicle M and the lane change limit point P1 is set to be within a threshold, the notification mode control unit 153 may notify of the information through a vibration of the vibrator 88.

Figure 5:
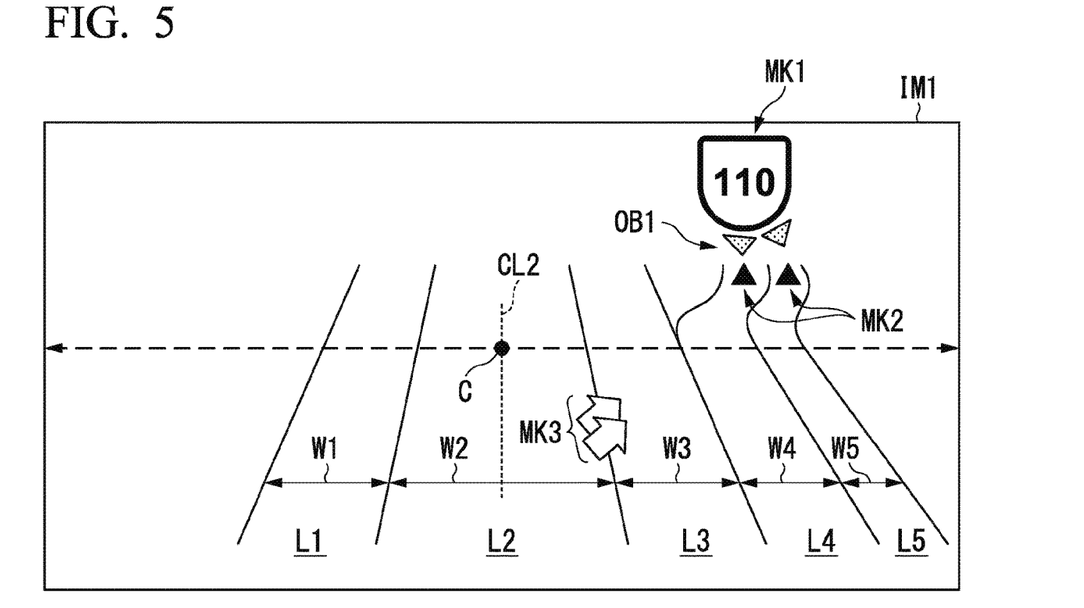
FIG. 5 is a diagram illustrating an example of an image which is displayed by an HUD.

Hereinafter, an example in which the information relating to driving assistance and the information relating to a lane change are displayed by the HUD 82 will be described. FIG. 5 is a diagram illustrating an example of an image IM1 which is displayed by the HUD 82. In the example of FIG. 5, the size of the image IM1 is assumed to correspond to the display region 82A. The same is true of the sizes of other images to be described below.

For example, at time t1 of FIG. 4, the vehicle M(t1) does not have a notification start time set for the lane L2. For this reason, the notification mode control unit 153 causes the HUD 82 to display the information relating to driving assistance. Specifically, as shown in FIG. 5, the notification mode control unit 153 causes the notification information generation unit 155 to generate an image obtained by arranging a plurality of lanes L1 to L5 so that a center line CL2 of the traveling lane L2 of the vehicle M among the five lanes L1 to L5 overlaps a center C of the display region 82A (image IM1) in a width direction. The center line CL2 and the center C overlapping each other may include a predetermined allowable error, for example, on the basis of the number of lanes, a road shape (for example, a curved road), the size of the display region 82A, or the like.

Regarding, for example, each of vehicle widths W1 to W5 of images of the lanes L1 to L5 generated in the notification information generation unit 155, the notification mode control unit 153 makes the vehicle width W2 of the lane L2 positioned at the center C of the display region 82A in a width direction larger than the vehicle widths W1 and W3 to W5 of other lanes, and displays a vehicle width to be smaller as a lane is located further outside than the center C. For example, the notification mode control unit 153 sets a vehicle width to be gradually smaller with a lane toward outside. Specifically, the notification mode control unit 153 displays the vehicle widths W1 and W3 of the lanes L1 and L3 located further outside than the lane L2 to be smaller than the vehicle width W2, and displays the vehicle width W4 of the lane L4 located further outside than the lane L3 to be smaller than the vehicle widths W1 and W3. Further, the notification mode control unit 153 displays the vehicle width W5 of the lane L5 located further outside than the lane L4 to be smaller than the vehicle width W4. The vehicle widths W1 and W3 may be the same as each other. The notification mode control unit 153 causes an occupant to recognize that the lanes L4 and L5 diverge from the lanes L1 to L3, and thus causes the notification information generation unit 155 to generate a lane shape change image in which a road shape after the divergence point of the lanes L4 and L5 is changed from a straight line to a curved line.

The notification mode control unit 153 displays an image relating to the above-described road shape at a predetermined timing. The predetermined timing may include, for example, a timing when the vehicle M travels a predetermined distance, a timing when a predetermined time has elapsed, a timing when a road or the link of the road (for example, identification information of a TMC link) is switched, a timing when a lane change is performed, or the like. The predetermined timing may include, for example, a timing when a junction such as divergence or merging of a road, or the like is present several hundreds [m] ahead.

The notification mode control unit 153 displays an image of sign information at a predetermined timing. In the example of FIG. 5, the notification mode control unit 153 displays a sign mark (an example of sign information) MK1 indicating road identification information of the recommended lanes L4 and L5 on the upper portion within the display region 82A. The notification mode control unit 153 may display the sign mark MK1, and display an indication object OB1 indicating a target lane of the sign mark MK1. In the example of FIG. 5, the object OB1 of the sign mark MK1 indicates the lanes L4 and L5.

The notification mode control unit 153 displays an image representing a recommended lane mark MK2 representing a recommended lane based on a traveling route to a destination set by the navigation device 50 on the image IM1 at a predetermined timing. In the example of FIG. 5, the recommended lane mark MK2 is displayed on the upper portion of an image representing the lanes L4 and L5.

Here, at time t2, the vehicle M(t2) has a notification start time set for the lane L2, and does not travel a recommended lane. Therefore, since the notification condition of lane change information is satisfied, the notification determination unit 154 determines that it is necessary to notify of the lane change guidance information. In this case, the notification mode control unit 153 causes the HUD 82 to display the direction of a recommended lane for the traveling lane of the vehicle M and an image representing a lane change mark MK3 for prompting a driver to perform a lane change together with an image representing the information relating to driving assistance. The lane change mark MK3 is displayed by, for example, an arrow mark, other marks representing a direction, a shape, character information, or the like. The notification mode control unit 153 displays the lane change mark MK3 on a division line that divides the lane L2 which is a traveling lane and the lane L3 which is a lane of a lane change destination. An occupant visually recognizes the lane change mark MK3 displayed on the HUD 82, and thus can easily ascertain that it is necessary to perform a lane change in order to travel toward a destination. The notification mode control unit 153 displays the lane change mark MK3 while the vehicle M travels in a notification section which is set for each lane. The layout of the display position, size, or shape of the sign mark MK1, the recommended lane mark MK2, the lane change mark MK3, the object OB1, or the like described above is not limited to the example of FIG. 5. The same is true of the following drawings.

In a case where an occupant recognizes the image IM1 shown in FIG. 5 and performs a lane change from the traveling lane L2 to the lane L3, the notification determination unit 154 determines whether the notification condition of a lane change which is set for the lane L3 is satisfied. For example, since the vehicle M does not reach the notification start time of the lane L3 at the position of the vehicle M(t3) at time t3 shown in FIG. 4, a condition in which a notification is required is not satisfied. Therefore, the notification determination unit 154 determines that it is unnecessary to notify of guidance information. However, at a section ΔD from the position of the vehicle M(t3) to the notification start point P2, in a case where the display of the lane change mark MK3 disappears from a screen after a lane change from the traveling lane L2 to the lane L3 is performed, an occupant misconceives that the vehicle can arrive at a destination even in the current lane L3, and there is the possibility of a lane change not being performed even at a timing when a lane change is possible. The vehicle M reaches the notification start point P2 of the lane L3, and the lane change mark MK3 is displayed again, whereby there is the possibility of causing a situation in which a driver is confused, and a lane change is not possible due to the influence of a nearby vehicle.

Consequently, in a case where the vehicle M starts a lane change, the notification mode control unit 153 continues to display the lane change mark MK3 regardless of the vehicle reaching a notification start point determined for each lane (or traveling in a notification section). For example, in a case where a lane change to the lane L3 is executed after the lane change mark MK3 is displayed while the vehicle M travels in the lane L2, the notification mode control unit 153 continues to display the lane change mark MK3 even when the notification start time which is set for the lane L3 after a lane change has not been reached. In this case, for example, in a case where a traveling lane recognized by the surrounding situation recognition unit 151 is changed, the notification mode control unit 153 determines that a lane change has been executed. In a case where it is recognized that traveling straddling a lane is performed by an analysis result of an image captured by the camera 10, the notification mode control unit 153 may determine that a lane change has been executed. The notification mode control unit 153 may determine whether a lane change has been executed on the basis of a road shape and the amount of change of vehicle speed, angular velocity, orientation, or the like detected by the vehicle sensor 40.

In a case where the lane change mark MK3 is continued to be displayed, the notification mode control unit 153 moves and displays the lane change mark on a division line between the current traveling lane of the vehicle M and a lane of a new lane change destination. That is, every time the traveling lane of the vehicle M is changed by a lane change, the notification mode control unit 153 continues to display the display position of the lane change mark MK3 while moving the display position in a stepwise manner toward the recommended lane.

Figure 6:
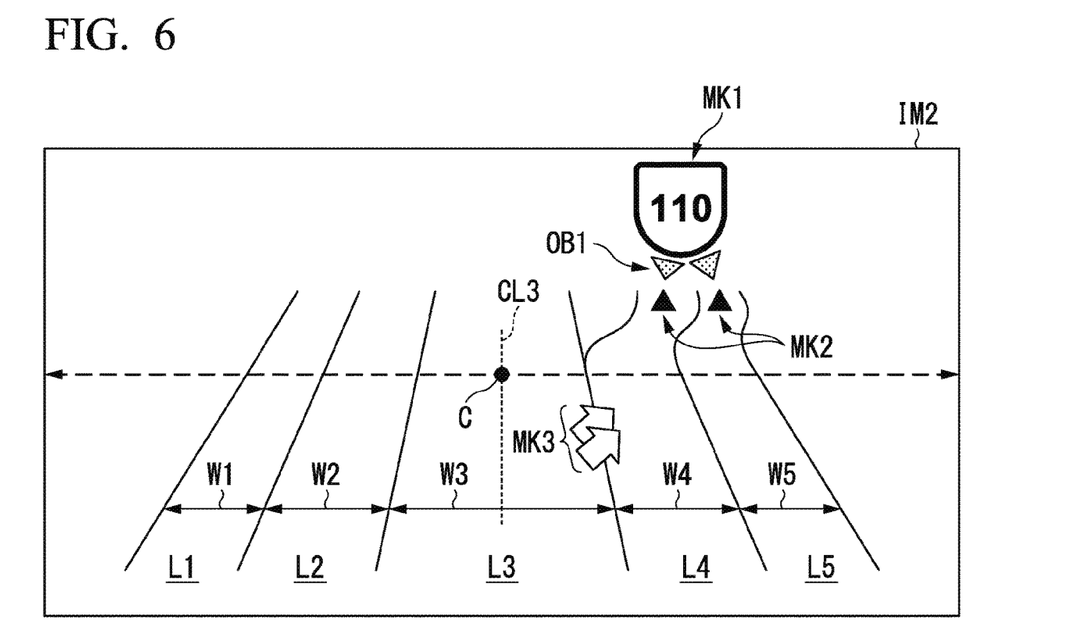
FIG. 6 is a diagram illustrating an example of an image IM2 which is displayed by the HUD at time t3.

FIG. 6 is a diagram illustrating an example of an image IM2 which is displayed by the HUD 82 at time t3. In the example of FIG. 6, since the vehicle M(t3) travels in the lane L3, an image in which a plurality of lanes are arranged is generated so that a center line CL3 of the lane L3 overlaps the center C of the display region 82A (the image IM2) in a width direction. Regarding the vehicle width of each lane, the vehicle width W3 is made larger than the vehicle widths W1 and W2, W4, and W5, and the vehicle widths W2 and W4 are made larger than the vehicle widths W1 and W5.

In the example of FIG. 6, since the vehicle M(t3) performs a lane change after the lane change mark MK3 shown in FIG. 5 is displayed, the notification mode control unit 153 causes the notification information generation unit 155 to generate an image in which the lane change mark MK3 is displayed even in a case where the notification condition in the lane L3 is not satisfied. In this case, the lane change mark MK3 is displayed on a division line that divides the lane L3 and the lane L4. Thereby, since an occupant can accurately ascertain a lane of a lane change destination, and the lane change mark MK3 is continued to be displayed, it is possible to perform a lane change smoothly from the lane L2 to the lane L4.

Figure 7:
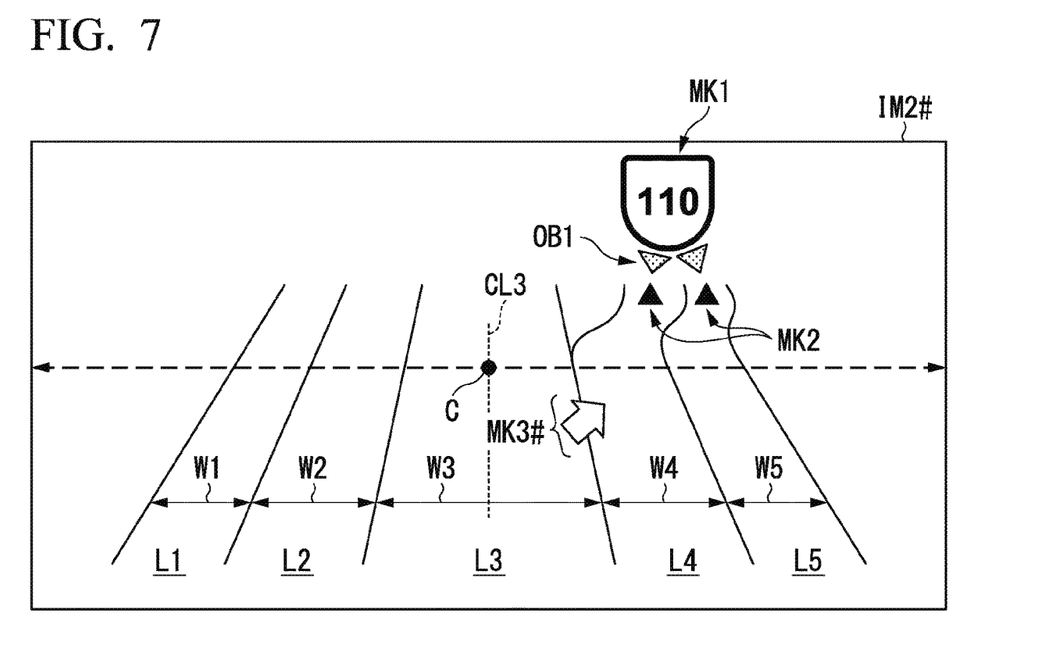
FIG. 7 is a diagram illustrating a state in which a lane change mark is changed and displayed for each traveling lane.

The lane change marks MK3 shown in the images IM1 and IM2 of FIGS. 5 and 6 show the same mark, but instead, the lane change mark MK3 may be changed on the basis of the number of lanes from the traveling lane to the recommended lane (in other words, the remaining number of lane changes). FIG. 7 is a diagram illustrating a state in which the lane change mark MK3 is changed and displayed for each traveling lane. For example, in a case where the vehicle M travels in the lane L2, the remaining number of lane changes to the recommended lane L4 is two. Therefore, as shown in FIG. 5, the notification mode control unit 153 causes the notification information generation unit 155 to generate the lane change mark MK3 obtained by superimposing a portion of two arrow marks. In a case where the vehicle M travels in the lane L3, the remaining number of lane changes from the lane L3 to the recommended lane L4 is one. Therefore, as shown in an image IM2 # of FIG. 7, the notification mode control unit 153 displays a lane change mark MK3 # using one arrow mark. Thereby, since an occupant can recognize the remaining number of lane changes through the lane change mark, it is possible to perform a lane change smoothly in good time.

Figure 8:
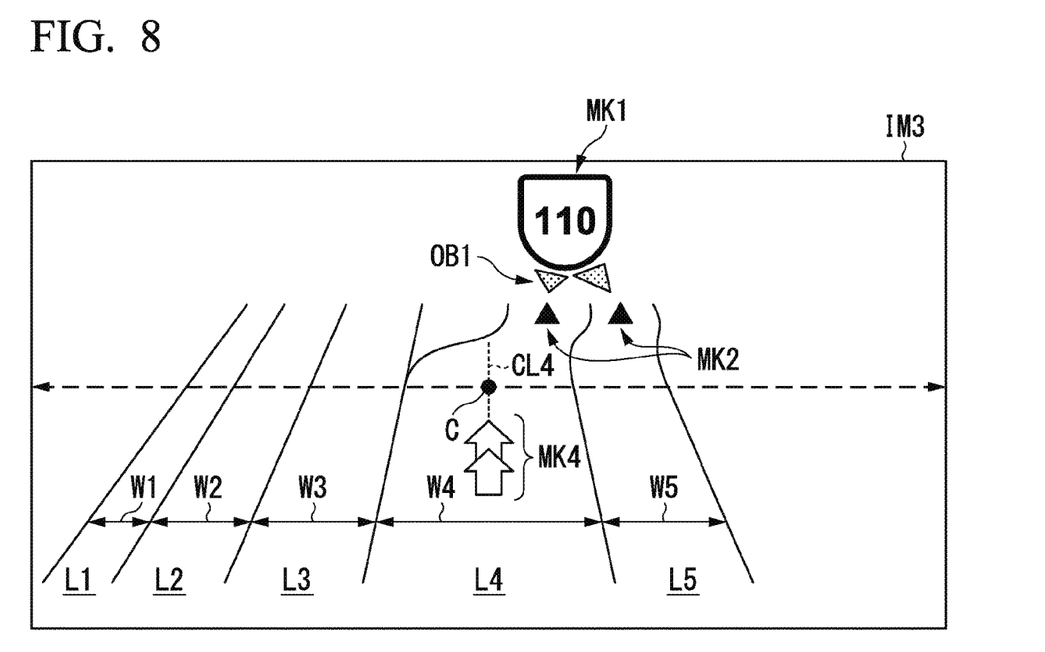
FIG. 8 is a diagram illustrating an example of an image in which lane change non-necessity information is displayed.

In a case where the vehicle M travels in a recommended lane before the vehicle reaches the lane change limit point P1, the notification mode control unit 153 may display an image representing lane change non-necessity information indicating that a lane change is unnecessary. FIG. 8 is a diagram illustrating an example of an image IM3 in which the lane change non-necessity information is displayed. In the example of FIG. 8, since the vehicle M travels in the recommended lane L4, an image in which a plurality of lanes are arranged is generated so that a center line CL4 of the lane L4 overlaps the display region 82A, that is, the center C of the image IM3 in a width direction. Regarding the vehicle width of each lane, the vehicle width W4 is made larger than the vehicle widths W1 to W3 and W5, the vehicle widths W3 and W5 are made larger than the vehicle widths W1 and W2, and the vehicle width W2 is made larger than the vehicle width W1.

In time t4 shown in FIG. 4, the vehicle M(t4) travels in the recommended lane L4, and does not reach the lane change limit point P1. Therefore, the notification mode control unit 153 causes the notification information generation unit 155 to generate an image representing a lane change non-necessity mark (an example of the lane change non-necessity information) MK4, and displays the generated lane change non-necessity mark MK4 on the lane L4. The lane change non-necessity mark MK4 is displayed by an arrow mark, other marks representing a direction, a shape, character information, or the like so that there is a tendency for an occupant to ascertain traveling along the lane L4. In the image IM3 shown in FIG. 8, the lane change non-necessity mark MK4 obtained by superimposing a portion of two arrows is displayed. Thereby, it is possible to cause an occupant to easily ascertain that a lane change is not required.

In a case where the vehicle M travels in the lanes L1 to L3 at a point in time when the vehicle reaches the lane change limit point P1, the notification mode control unit 153 ends displaying the lane change mark MK3. As the traveling lane of the vehicle M becomes farther away from the recommended lane, the notification mode control unit 153 may set the arrival point of the vehicle M for ending displaying the lane change mark MK3 to a point which is made more distant from the divergence point (lane change point) P0. That is, as the traveling lane of the vehicle M becomes farther away from the recommended lane, the above-described lane change limit point P1 may be made more distant from the divergence point (lane change point) P0. In a case where the vehicle M travels in the lanes L1 to L3 at a point in time when the vehicle reaches the divergence point P0, the notification mode control unit 153 may end displaying the lane change mark MK3. Thereby, it is possible to suppress prompting an occupant to perform a lane change in a situation in which a lane change is not possible. In a case where the display of the lane change mark MK3 is ended on the basis of the above-described condition, the notification mode control unit 153 resets a notification mode for notifying of the information relating to driving assistance or the information relating to a lane change on the basis of the traveling lane and the recommended lane of a route which is set by the navigation device 50 again.

In a case where the vehicle M travels in the lane L4 or L5 at a point in time when the vehicle reaches the lane change limit point P1, the notification mode control unit 153 may end displaying the lane change non-necessity mark MK4.

The notification mode control unit 153 may display a portion or the entirety of an image of various types of marks, objects, lanes, or the like described above through an animation image.

[Process Flow]

Figure 9:
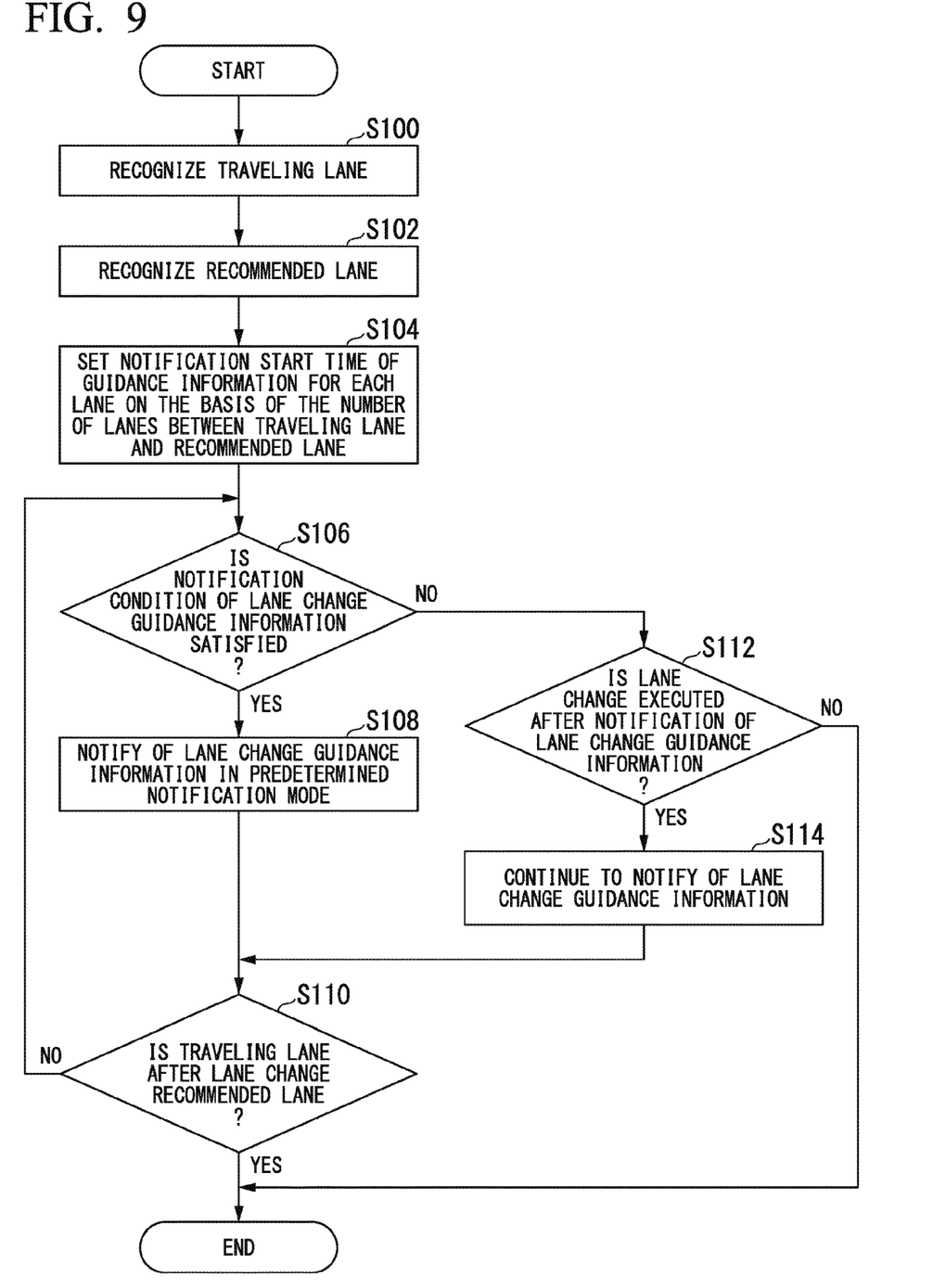
FIG. 9 is a flow chart illustrating an example of a flow of processes which are executed by the notification system of the embodiment.

FIG. 9 is a flow chart illustrating an example of a flow of processes which are executed by the notification system of the embodiment. The processes of the present flow chart is repeatedly executed, for example, with a predetermined period during the execution of the navigation device 50.

Hereinafter, a process of notifying of the lane change guidance information will be mainly described. In the example of FIG. 9, the surrounding situation recognition unit 151 recognizes the surrounding situation of the vehicle M, and recognizes the traveling lane of the vehicle M (step S100). Next, the recommended lane acquisition unit 152 acquires a recommended lane based on a route to a destination from the navigation device 50 (step S102). Next, the notification mode control unit 153 sets a notification start time of the lane change guidance information for each lane in which traveling in the same direction as the traveling direction of the vehicle M is possible on the basis of the number of lanes between the traveling lane and the recommended lane (step S104).

Next, the notification determination unit 154 determines whether the notification condition of the lane change guidance information is satisfied on the basis of the traveling position (traveling lane) of the vehicle M and the notification start time (step S106). In a case where it is determined that the notification condition of the lane change guidance information is satisfied, the notification mode control unit 153 notifies a driver of the lane change guidance information in a predetermined notification mode (step S108). Next, the notification mode control unit 153 determines whether the traveling lane of the vehicle M after a lane change is a recommended lane (step S110). In a case where it is determined that the traveling lane is not a recommended lane, the flow returns to the process of step S106. In a case where the traveling lane after a lane change is a recommended lane, the process of the present flow chart is ended.

In a case where it is determined in the process of step S106 that the notification condition of the lane change guidance information is not satisfied, the notification mode control unit 153 determines whether a lane change is executed after a notification of the lane change guidance information (step S112). In a case where it is determined that a lane change is executed after a notification of the lane change guidance information, the notification mode control unit 153 continues to notify of the lane change guidance information which is notified of during the immediately preceding lane change (step S114), and the flow returns to the process of step S110. In the process of step S112, in a case where a lane change is not executed after a notification of the lane guidance information, the process of the present flow chart is ended.

According to the embodiment described above, the notification system includes the route decision unit 53 that decides a route to a destination of the vehicle M, the HMI 80 that notifies an occupant of guidance information for guiding the occupant regarding a lane change from the traveling lane of the vehicle M to a recommended lane associated with the route to the destination decided by the route decision unit 53, and the HMI control unit 150 that controls a notification start time of the guidance information for each lane on the basis of the number of lanes between and the traveling lane and the recommended lane, and in a case where the vehicle M performs a lane change after a notification of the guidance information, the HMI control unit 150 continues a notification of the guidance information even when a notification start time which is set for a lane after a lane change has not been reached, whereby it is possible to notify the occupant of the guidance information relating to a lane change in a more appropriate notification state.

Specifically, according to the present embodiment, in a case where the number of lanes from the traveling lane to the recommended lane is plural, the guidance information relating to a lane change is continued to be notified of until the vehicle M performs an initial lane change and then the vehicle M reaches a lane to the vehicle is to be moved finally, whereby it is possible to cause an occupant to perform a lane change to the recommended lane smoothly.

[Hardware Configuration]

Figure 10:
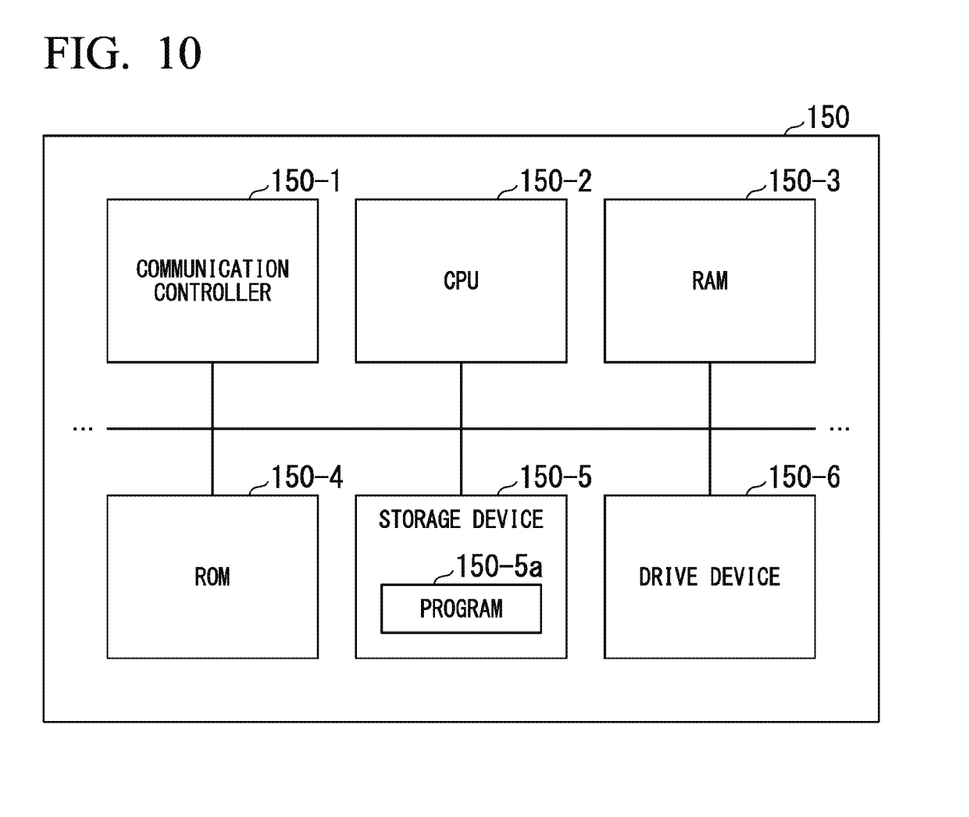
FIG. 10 is a diagram illustrating an example of a hardware configuration of the HMI control unit of the embodiment.

The HMI control unit 150 of the notification system of the embodiment described above is realized by, for example, the configuration of computer hardware as shown in FIG. 10. FIG. 10 is a diagram illustrating an example of the hardware configuration of the HMI control unit 150 of the embodiment.

The HMI control unit 150 is configured such that a communication controller 150-1, a CPU 150-2, a RAM 150-3, a ROM 150-4, a storage device 150-5 such as a flash memory or an HDD, and a drive device 150-6 are connected to each other through an internal bus or a dedicated communication line. The drive device 150-6 has a portable storage medium such as an optical disc mounted therein. A program 150-5*a* stored in the storage device 150-5 is developed into the RAM 150-3 by a DMA controller (not shown) or the like, and is executed by the CPU 150-2, whereby the functional unit of the HMI control unit 150 is realized. In addition, the program which is referred to by the CPU 150-2 may be stored in a portable storage medium mounted in the drive device 150-6, and may be downloaded from other devices through a network NW.

The above embodiment can be represented as follows.

a notification system including a storage device; and a hardware processor that executes a program stored in the storage device, wherein the hardware processor executes the program to thereby:

decide a route to a destination of a vehicle;

notify an occupant of guidance information for guiding the occupant regarding a lane change from a traveling lane of the vehicle to a recommended lane associated with the decided route to the destination; and control a notification start time of the guidance information for each lane on the basis of the number of lanes between the traveling lane and the recommended lane, and wherein, in a case where the vehicle performs a lane change after a notification of the guidance information, the HMI control unit continues a notification of the guidance information even when a notification start time which is set for a lane after a lane change has not been reached.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A notification system comprising:
   a processor that executes instructions to:
   determine a route from a location of a vehicle to a destination, and determine a recommended lane based on the route to the destination so that the vehicle has a tendency to advance to a divergence point or a merging point associated with a junction in a case that the junction at the divergence point or the merging point includes a plurality of lanes in which traveling is possible in a same direction as a traveling direction of the vehicle is present in the route on a map;

notify, to an occupant, guidance information for guiding the occupant regarding a lane change from a traveling lane of the vehicle to the recommended lane;

recognize a surrounding situation of the vehicle that includes a road shape surrounding the vehicle, a number of lanes, and the traveling lane;

control a notification start time of the guidance information based on a number of lanes between the traveling lane and the recommended lane; and determine that it is necessary to notify the occupant of the guidance information in a case that the traveling lane of the vehicle is not the recommended lane and the vehicle has reached the notification start time, wherein, in a case where it is determined that it is necessary to notify the occupant of the guidance information and the vehicle performs a lane change after notifying the occupant of the guidance information, continuing to notify the occupant of the guidance information even when the notification start time which is set for a lane after a lane change has not been reached, wherein control of the notification start time of the guidance information for a first lane of the plurality of lanes is based on a number of lanes that exist between the traveling lane and the recommended lane, based on the vehicle having performed the lane change from the first lane to a second lane after a display of the guidance information, continuing to display the guidance information even when the notification start time, that has been set for the first lane, has not expired after the lane change to the second lane has been performed, and wherein the guidance information further comprises first road indicator marking data representing road signage data, first indicator object data representing target lane data associated with the road signage data, second road indicator marking data representing recommended lane data that is determined based on the route to the destination, and third indicator marking data representing direction arrow data associated with the destination of the vehicle.

2. The notification system according to claim 1, wherein the processor further executes instructions to: set the notification start time with respect to each of the plurality of lanes in which traveling is possible in the same direction as a traveling direction of the vehicle based on a lane change limit point at which a change of lane to the recommended lane is possible.

3. The notification system according to claim 2, wherein the processor further executes instructions to: set the notification start time for each of the plurality of lanes based on a distance from the lane change limit point.

4. The notification system according to claim 3, wherein, based on determining that the traveling lane is farther away from the recommended lane, the processor further executes instructions to: increase the distance from the lane change limit point at a predetermined interval, and respectively set the notification start time for each of the plurality of lanes.

5. The notification system according to claim 2, wherein the processor further executes instructions to: end the notification of the guidance information in a case where the vehicle is not traveling in the recommended lane and the vehicle has reached the lane change limit point.

6. The notification system according to claim 5, wherein, based on the traveling lane of the vehicle being farther away from the recommended lane, the lane change limit point is determined to be more distant from a lane change point.

7. The notification system according to claim 1, wherein, in a case where the vehicle is traveling in the recommended lane, the processor further executes instructions to: notify, in place of the guidance information, lane change non-necessity information indicating that a change of lane is unnecessary.

8. The notification system according to claim 1, wherein the processor further executes instructions to: display an image, and move and display the image relating to the guidance information based on a change of the traveling lane of the vehicle.

9. A notification control method comprising causing a computer coupled to a processor to:

determine a route from a location of a vehicle to a destination, and determine a recommended lane based on the route to the destination so that the vehicle has a tendency to advance to a divergence point or a merging point at a junction in a case that the junction at the divergence point or the merging point includes a plurality of lanes in which traveling is possible in a same direction as a traveling direction of the vehicle is present in the route on a map;

notify, to an occupant, guidance information for guiding the occupant regarding a lane change from a traveling lane of the vehicle to the recommended lane;

recognize a surrounding situation of the vehicle to include a road shape surrounding the vehicle, a number of lanes, and the traveling lane of the vehicle;

control a notification start time of the guidance information based on a number of lanes between the traveling lane and the recommended lane;

determine that it is necessary to notify the occupant of the guidance information in a case that the traveling lane of the vehicle is not the recommended lane and the vehicle has reached the notification start time; and continuing to notify, in a case where it is determined that it is necessary to notify the occupant of the guidance information and the vehicle performs a lane change after notifying the occupant of the guidance information, the guidance information even when the notification start time, which is set for a lane after a lane change has not been reached, wherein control of the notification start time of the guidance information for a first lane of the plurality of lanes is based on a number of lanes that exist between the traveling lane and the recommended lane, based on the vehicle having performed the lane change from the first lane to a second lane after a display of the guidance information, continuing to display the guidance information even when the notification start time, that has been set for the first lane, has not expired after the lane change to the second lane has been performed, and wherein the guidance information further comprises first road indicator marking data representing road signage data, first indicator object data representing target lane data associated with the road signage data, second road indicator marking data representing recommended lane data that is determined based on the route to the destination, and third indicator marking data representing direction arrow data associated with the destination of the vehicle.

10. A computer readable non-transitory storage medium having a program stored therein, the program causing a computer to:

determine a route from a location of a vehicle to a destination, and determine a recommended lane based on the route to the destination so that the vehicle has a tendency to advance to a divergence point or a merging point of a junction in a case that the junction at the divergence point or the merging point includes a plurality of lanes in which traveling is possible in a same direction as a traveling direction of the vehicle is present in the route in a map;

notify, to an occupant, guidance information for guiding the occupant regarding a lane change from a traveling lane of the vehicle to the recommended lane;

recognize a surrounding situation of the vehicle that includes a road shape surrounding the vehicle, a number of lanes, and the traveling lane;

control a notification start time of the guidance information based on a number of lanes between the traveling lane and the recommended lane;

determine that it is necessary to notify the occupant of the guidance information in a case that the traveling lane of the vehicle is not the recommended lane and the vehicle has reached the notification start time; and continuing to notify, in a case where it is determined that it is necessary to notify the occupant of the guidance information and the vehicle performs a lane change after notifying the occupant of the guidance information, the guidance information even when the notification start time which is set for a lane after a lane change has not been reached, wherein control of the notification start time of the guidance information for a first lane of the plurality of lanes is based on a number of lanes that exist between the traveling lane and the recommended lane, based on the vehicle having performed the lane change from the first lane to a second lane after a display of the guidance information, continuing to display the guidance information even when the notification start time, that has been set for the first lane, has not expired after the lane change to the second lane has been performed, and wherein the guidance information further comprises first road indicator marking data representing road signage data, first indicator object data representing target lane data associated with the road signage data, second road indicator marking data representing recommended lane data that is determined based on the route to the destination, and third indicator marking data representing direction arrow data associated with the destination of the vehicle.

\* \* \* \* \*